United States Patent [19]
Burch

[11] Patent Number: 5,609,395
[45] Date of Patent: Mar. 11, 1997

[54] MODULAR BUS SEAT AND METHOD OF RETROFITTING EXISTING BUS SEATS

[76] Inventor: Selwyn A. Burch, 30627 Webster Rd., Bay Village, Ohio 44140

[21] Appl. No.: 530,451

[22] Filed: Sep. 18, 1995

[51] Int. Cl.$^6$ ..................................................... A47C 7/18
[52] U.S. Cl. .................. 297/452.55; 297/452.61; 297/452.2; 297/335; 297/336
[58] Field of Search ................. 297/452.55, 440.2, 297/452.18, 452.2, 452.61, 452.29, 452.33, 336, 335

[56] References Cited

U.S. PATENT DOCUMENTS

| | | | |
|---|---|---|---|
| 3,482,875 | 12/1969 | Barecki et al. | 297/452.55 X |
| 3,642,322 | 2/1972 | Bilancio | 297/452.55 X |
| 3,695,707 | 10/1972 | Barecki et al. | 297/452.55 |
| 3,797,887 | 3/1974 | Barecki et al. | 297/452.55 X |
| 3,823,980 | 7/1974 | Harnick | 297/452.55 X |
| 3,861,747 | 1/1975 | Diamond | 297/452.2 X |
| 4,275,925 | 6/1981 | Harder, Jr. | 297/452.2 X |
| 4,580,841 | 4/1986 | Raftery | 297/452.55 |
| 4,672,698 | 6/1987 | Sands | 297/452.55 X |
| 4,871,209 | 10/1989 | Handelman | 297/452.55 X |
| 4,936,631 | 6/1990 | Mochida et al. | 297/452.2 X |

FOREIGN PATENT DOCUMENTS

| | | | |
|---|---|---|---|
| 1333869 | 6/1963 | France | 297/452.2 |
| 2850654 | 5/1979 | Germany | 297/452.55 |
| 915614 | 1/1963 | United Kingdom | 297/452.55 |

*Primary Examiner*—Peter M. Cuomo
*Assistant Examiner*—Rodney B. White
*Attorney, Agent, or Firm*—Woodling, Krost & Rust

[57] ABSTRACT

A bus seat comprising a metal frame, a bus seat back and a bus seat; said bus seat back includes a front modular portion; a rear modular portion; and a collar portion; said front modular portion affixed to said metal frame; said rear modular portion affixed to said front modular portion; and said collar portion affixed to said front modular portion adjacent said front and rear modular portions. The bus seat is affixed to the metal frame. The modular construction of the bus seat back enables replacement of a specific section or sections of the bus seat. The bus seat back and bus seat can be used in retrofit installations or in new installations. The bus seat back and bus seat are constructed of an elastomer skinned urethane foam which adheres to front, rear and bottom pieces of plywood. The collar portion is constructed of the elastomer skinned urethane foam but does not include a plywood portion. The collar portion is affixed to the front plywood portion.

12 Claims, 9 Drawing Sheets

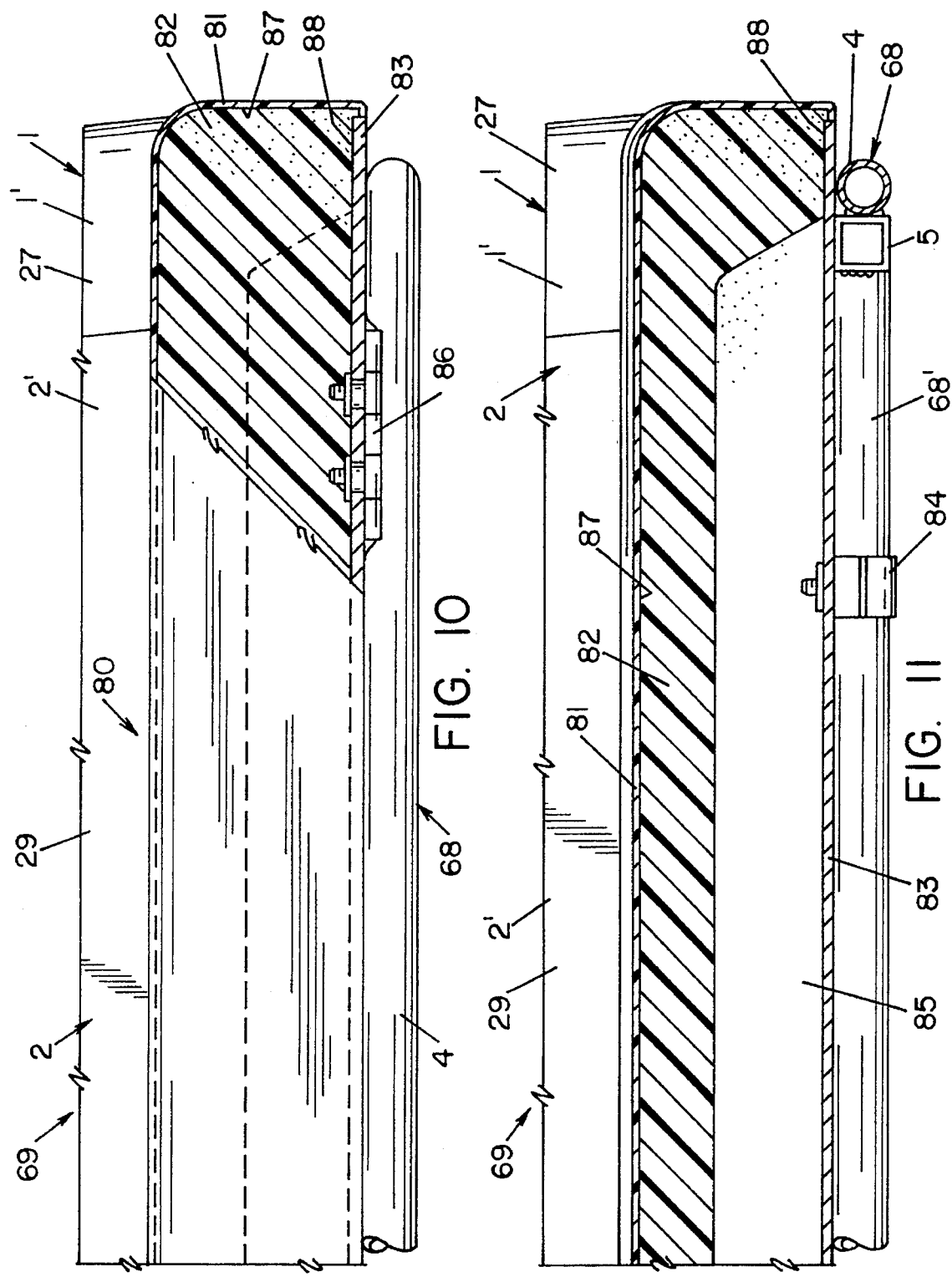

MODULAR BUS SEAT AND METHOD OF RETROFITTING EXISTING BUS SEATS

BACKGROUND OF THE INVENTION

This invention relates to a modular bus seat construction. In particular this invention is directed to school bus seats. Specifically, this invention relates to a new bus seat construction or to a retrofit of an existing bus seat. This new inventive bus seat is comprised of a front modular portion, a rear modular portion, a collar portion and a seat portion. The front, rear and seat portions are comprised of wood and a elastomer skinned urethane foam. The elastomer skinned urethane foam is adhered to the plywood. The collar portion is comprised of an elastomer skinned urethane foam. The front modular portion, the rear modular portion, and the collar portion comprise the bus seat back.

Existing school bus seats are comprised of a metal frame and a plywood superstructure. In particular, for the bus seat back the plywood is inserted into the metal frame and it is maintained in place by means of the plywood being crimped into position within a channel. In regard to the bus seat, plywood is affixed to the metal frame by hinge and locking means. A rebonded foam is used on the existing school bus seats. A vinyl is stretched over the rebonded foam and is sewn together. One deficiency of the existing school bus seat is that the vinyl which is stretched over the rebonded foam is easily torn. Vandalism on school buses is quite common. The usual site of the vandalism is on the rear of the bus seat.

SUMMARY OF THE INVENTION

The present invention relates to a bus seat which is comprised of a front modular portion, a rear modular portion, collar portion, and a seat portion. The front modular portion comprises a first piece of plywood which has adhered to it an elastomer skinned urethane foam. The front modular portion is manufactured by coating the inside of a mold with a spray elastomer. A piece of plywood is then inserted into the mold. The mold is next injected with a urethane foam which adheres to the plywood and to the sprayed on elastomer such that the wood-urethane foam-elastomer skin becomes a single integral construction.

The same process is used to manufacture the rear and seat modular portions of the present invention. In a similar fashion, the collar portion is of an integral construction although the collar portion does not have a plywood or a wood superstructure.

In particular, the present invention is designed primarily, although not exclusively, to meet the needs of retrofitting existing school bus seats. The existing school bus seats are inadequate such that the materials they are manufactured from, to wit, a vinyl which is sewn and stretched over a rebonded foam, is easily torn by vandals. Additionally, in the case of the existing school bus seats, the entire seat back or seat needs to be repaired when a section thereof has been vandalized. For instance, if a vandal rips the back of a bus seat back, the entire vinyl covering must be removed and repaired or replaced. The present invention provides an integrally bonded elastomer skinned urethane foam plywood structure. The elastomer skin of the present invention can be made in different thicknesses; therefore, if a thicker surface is desired on the back side of the bus seat back which is typically the case, such a thickness can be easily provided.

It is an object of the present invention to provide a bus seat of modular construction. Specifically, the bus seat of the present invention comprises a front modular portion, a rear modular portion, a collar portion, and a seat portion.

It is an object of the present invention to provide a modular bus seat which may be used to replace existing bus seats. This is accomplished through the simple removal of the existing plywood used in the school bus seat. It is then replaced with the appropriate modular portion of the present invention. The rear modular portion of the bus seat back is affixed to the front modular portion. The seat modular portion is affixed to the bus seat frame. The collar portion generally surrounds the existing metal frame of the bus seat back and is affixed to the front modular portion of the bus seat.

It is an object of the present invention to provide a modular bus seat which enables the replacement of one portion of the bus seat at a time. For instance, the present invention permits replacement of the back or rear modular portion of the bus seat back through the simple disconnection of the rear modular portion by means of loosening a few bolts.

It is an object of the present invention to provide a school bus seat which is durable. In particular, the present invention provides a school bus seat having an elastomer skinned surface which is durable and which may be of varying thicknesses in various places.

It is an object of the present invention to provide a process for retrofitting existing school bus seats which comprise the steps of removing existing plywood from the existing bus seat frame, spraying a mold with an elastomer spray, inserting a piece of wood into the mold, and then injecting the mold with the urethane foam which bonds to the wood and integrally forms an elastomeric skin thereon, and then finally by inserting the wood with the elastomer skinned urethane foam adhered thereto into engagement with the bus seat frame.

These and other objects of the invention will be best understood in connection with the brief description of the drawings and the description of the preferred embodiment and claims which follow.

BRIEF DESCRIPTION OF THE DRAWINGS

FIG. 5 illustrates the front modular portion, the rear modular portion, the collar portion and the bus seat frame. FIG. 5 also illustrates the elastomer skinned urethane foam adhered to the front and rear pieces of plywood. FIG. 5 also illustrates the tongue of the collar portion within the front and rear modular portions of the bus seat back. FIG. 5 also illustrates the contour of the rear modular portion of the bus seat;

FIG. 6 illustrates the connection of the first and second pieces of wood and the connection of the first piece of wood to the metal frame;

FIG. 10 is a partial cross-sectional view of the bus seat taken along the lines 10—10 of FIG. 9; and FIG. 11 is a cross-sectional view of the bus seat taken along the lines 11—11 of FIG. 9.

DESCRIPTION OF THE PREFERRED EMBODIMENT

Figure 1:
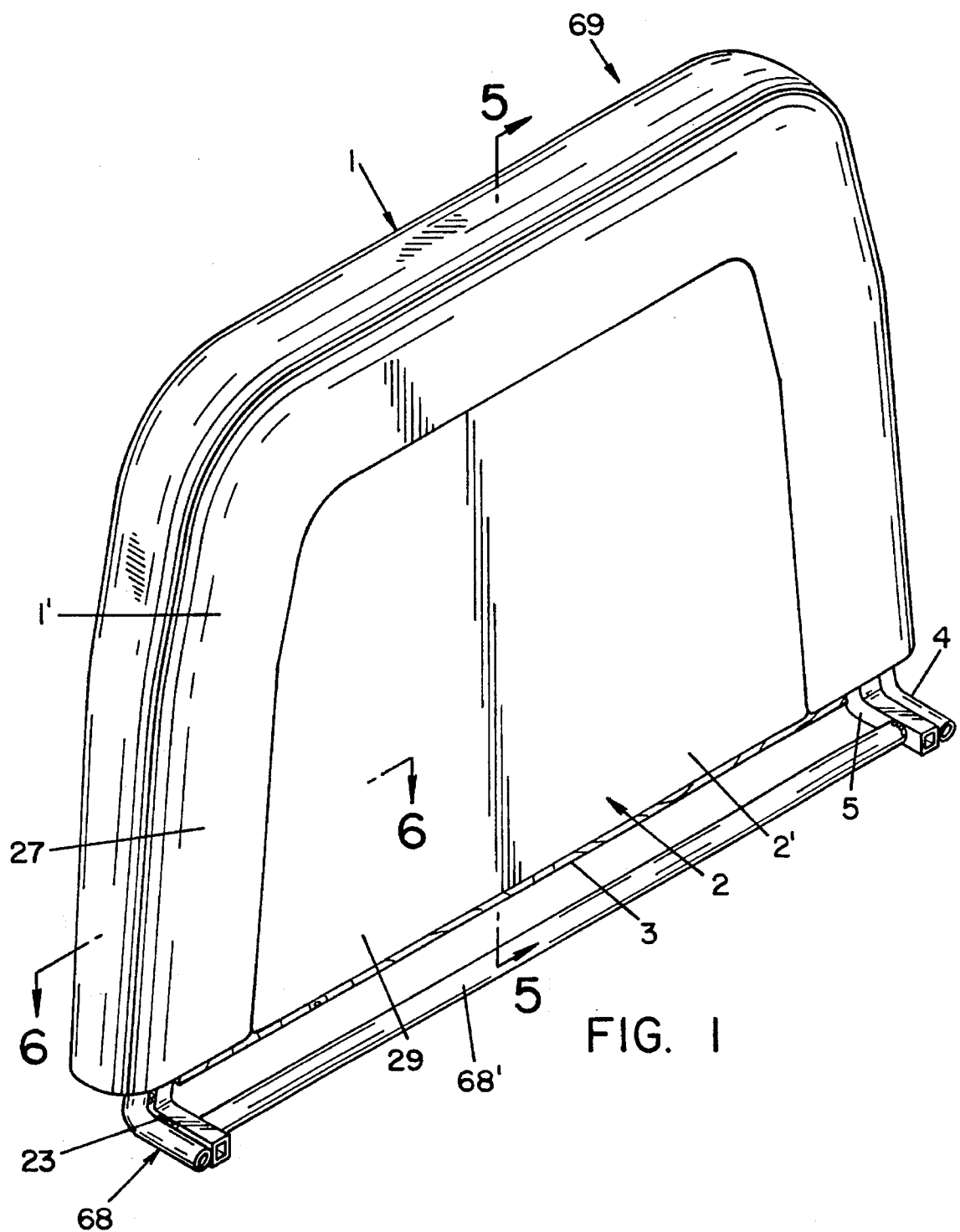
FIG. 1 is front perspective view of the modular bus seat back of the invention.

FIG. 1 is a front perspective view of the modular bus seat back of the present invention. FIG. 1 illustrates the front view of the modular bus seat back 69 and as can be seen from FIG. 1, the front of the bus seat is substantially planar. The front surface 27 of the collar 1 is substantially in the same plane as the front surface 29 of the front modular portion 2. The rear exterior surface 28 of collar 1 is contoured. See, FIG. 6. Additionally from FIG. 6 it can be seen that the collar 1 includes flexible urethane foam 8 within an integrally bonded elastomer skin 1'. From FIG. 6 it can be seen that there is more urethane foam 8 rearwardly than forwardly. Reference numeral 2 refers to the front modular portion of the invention. The front modular portion 2 includes an integrally bonded elastomer skin 2'. The collar portion 1 similarly includes an integrally bonded elastomeric skin 1' thereon. FIG. 1 also illustrates the front plywood 3 extending across and beyond the breadth or width of the front modular portion 2. It will be understood by those skilled in the art that the present invention is not limited to the use of a specific kind or type of wood.

FIG. 1 partially illustrates the existing superstructure of today's bus seat backs. In particular, the superstructure or frame of the existing bus seats is comprised of a tubular structure 4 which is additionally supported with a rectangular channel 5.

Figure 2:
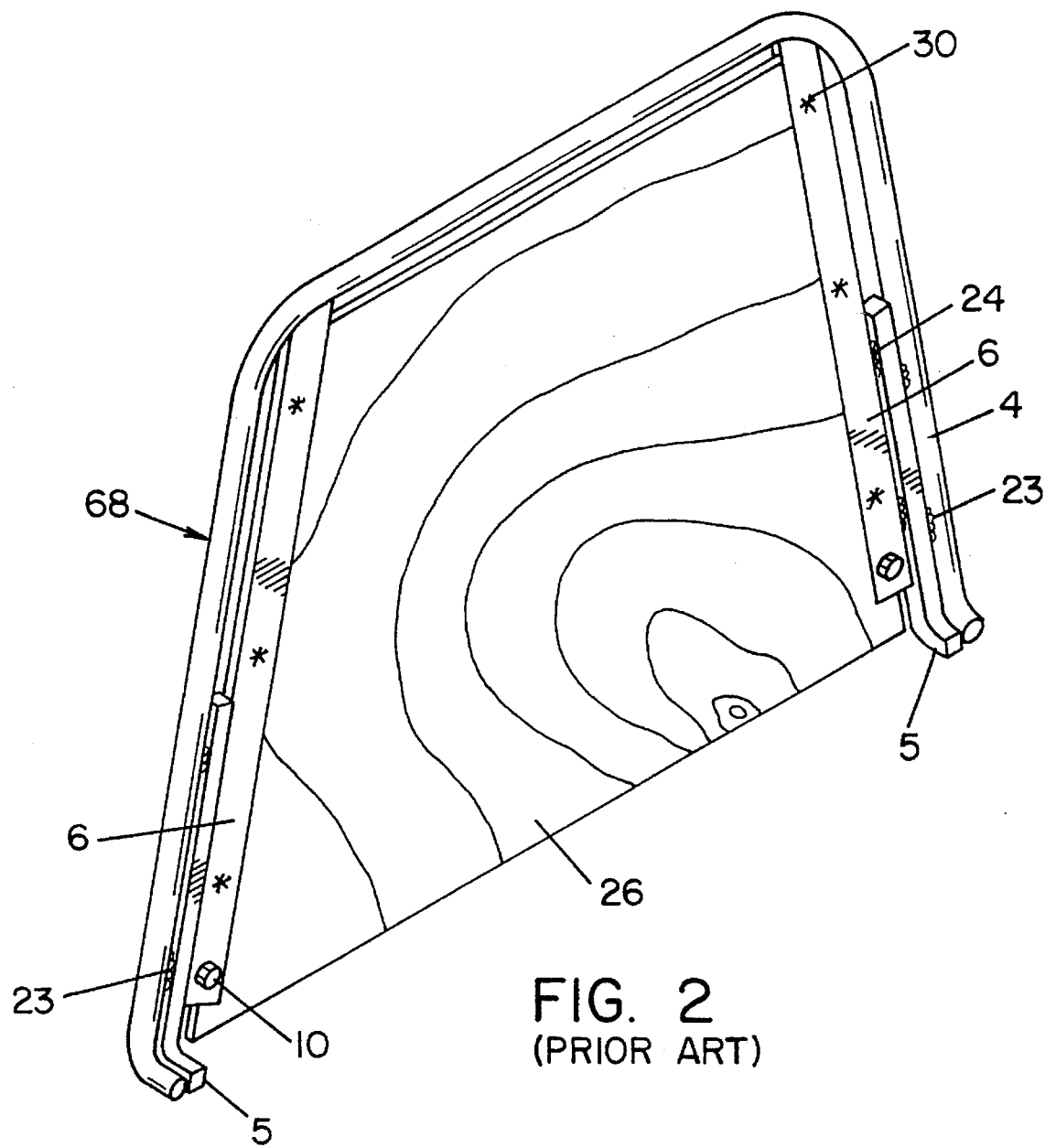
FIG. 2 is a front perspective view of an existing bus seat back frame illustrating a metal frame and a single piece of plywood.

FIG. 2 illustrates the existing superstructure 68 of a school bus seat back. FIG. 2 illustrates the tubular structure 4 which goes all the way up and down the sides of the school bus seat and across the top. FIG. 2 also illustrates the rectangular channel 5 which extends approximately midway up the tubular support. Also shown in FIG. 2 is the channel 6 which secures the plywood in place. The plywood 26 illustrated in FIG. 2 is held in place within the channel 6 by means of crimps 30 and connector 10. In the retrofitting process the crimps are simply removed by drilling or boring a hole at the location of the crimp. This allows the plywood 26 to be removed by sliding it out of the channel in a downward direction. The various frame components, to wit, the tubular support 4, the rectangular channel 5 and the plywood channel 6 are tack welded together.

The existing superstructure 68 of the school bus seat back is used in the present invention provided, of course, it has not been damaged. The existing superstructure 68 also supports the modular seat portion 80 as shown in FIGS. 8, 9, 10 and 11.

Figure 3:
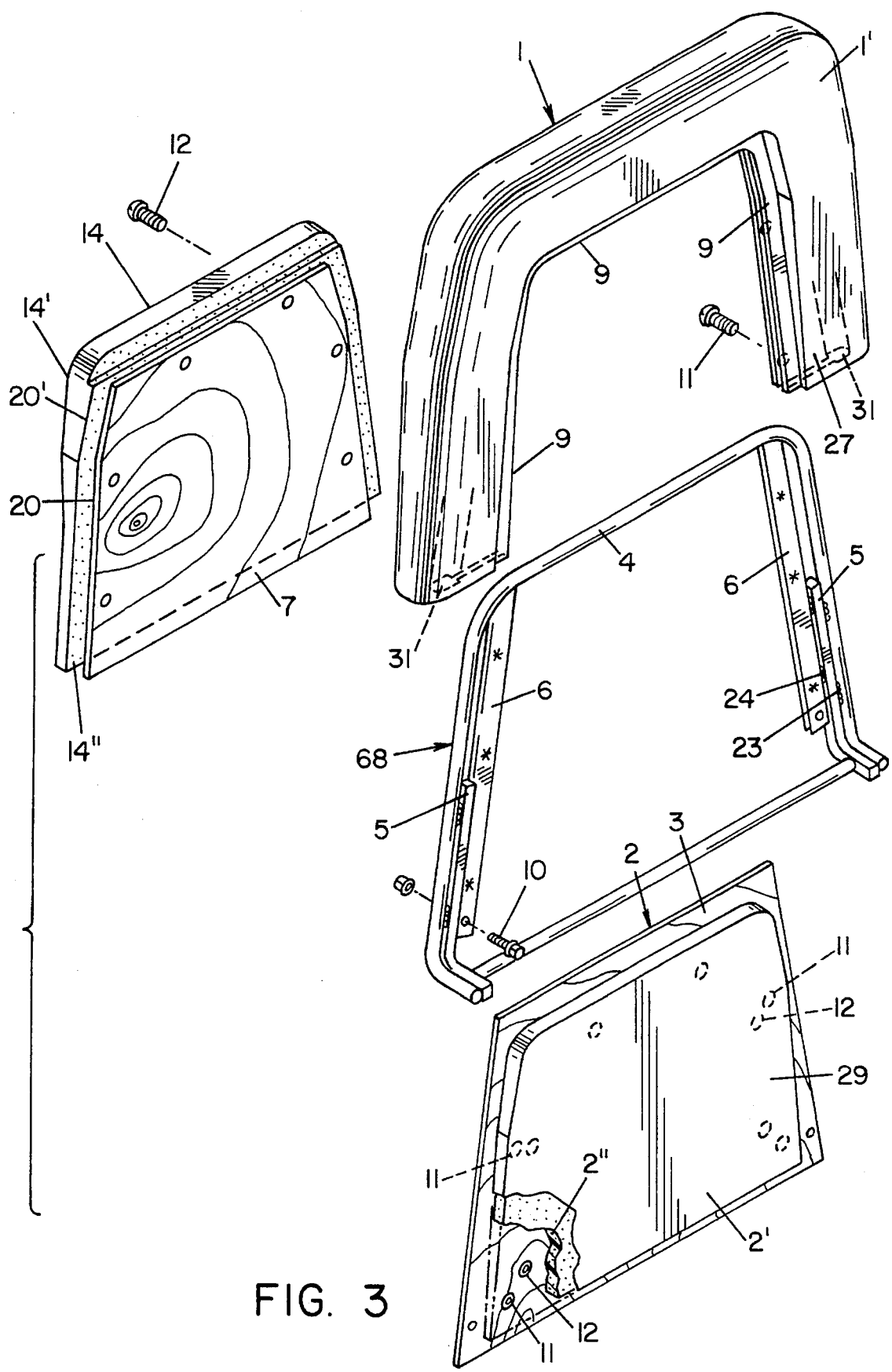
FIG. 3 is a perspective view of the modular bus seat of the present invention illustrating the front modular portion, the bus seat back frame, the collar and the rear modular portion.

FIG. 3 is a perspective view of the modular bus seat back of the present invention illustrating the assembly of the front modular portion, the frame, the rear modular portion, and the collar. FIG. 3 illustrates the front plywood 3 positioned to be assembled into the metal frame superstructure 68. The plywood slides into channel 6 and is bolted in place. The rear modular portion 14 is then affixed to the front modular portion 2 by means of connector 12. Collar 1 is then affixed to the front plywood by means of connector 11. In the preferred embodiment the connectors are screws and sockets. However, those skilled in the art will recognize that there are a plurality of fastening mechanisms available to affix the various modular portions of the invention together.

Figure 4:
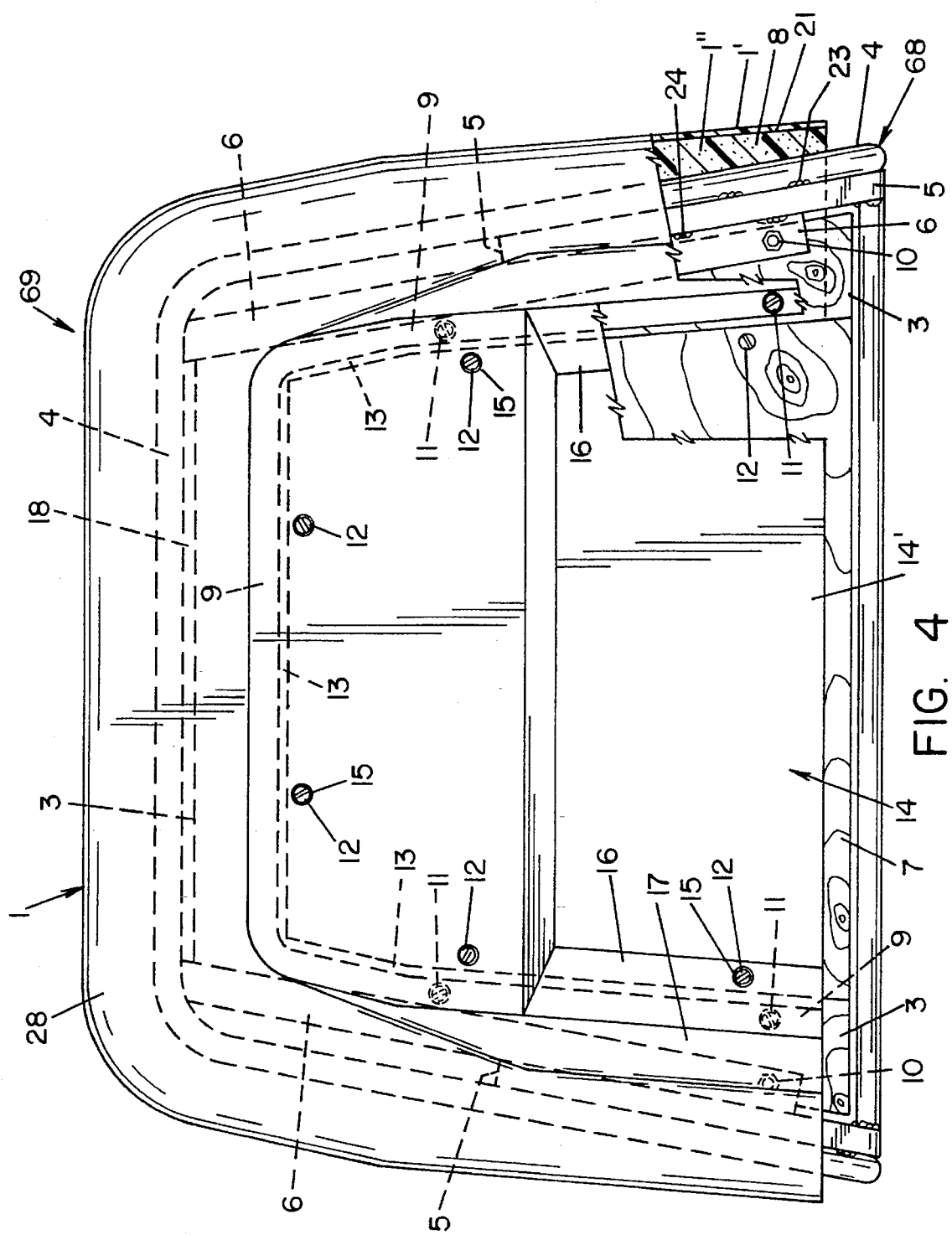
FIG. 4 is a rear view with parts broken away of the modular bus seat illustrating the bus seat back frame, the front and rear pieces of plywood and the collar.

FIG. 4 is a rear view of the present invention. FIG. 4 illustrates the front piece of plywood 3 and the rear piece of plywood 7. It can be seen from FIG. 4 that the front piece of plywood 3 extends upwardly into the channel 6. The plywood is held in place by connector 10.

FIG. 4 also illustrates the rear plywood 7 connected to the front plywood 3 by means of connector 12. In the preferred embodiment, the connector 12 is simply a screw and a socket. Also, see FIG. 6 which illustrates connectors 10, 11 and 12.

FIG. 4 also illustrates the upward extent of the first piece of plywood 3. The first piece of plywood 3 extends upwardly in the vicinity of the tubular support 4. However, it will be seen from FIG. 4 that the plywood 3 does not extend quite up to the tubular support 4. Rather, it terminates before the support 4 leaving a gap 18 between the tubular support 4 and the plywood 3.

The collar 1 includes a tongue shaped portion 9. This is best viewed in FIGS. 5 and 6. The tongue shaped portion is also indicated in FIG. 4 and it will be seen from FIG. 4 that the tongue shaped portion is affixed to the first piece of plywood by means of connector 11. Connector 11 is a screw and socket arrangement as can best be seen in FIG. 6. The tongue shaped portion 9 extends around the interior of the collar as can be seen in FIGS. 3 and 4.

FIG. 4 also illustrates tack welds 23 and 24 for affixing the tubular support 4 to the rectangular support 5 and the rectangular support 5 to the channel 6. FIG. 4 also illustrates the first beveled surface 16 on the rear modular portion 14 and the second beveled surface 17 on the rear modular portion 14. This rear modular portion 14 of the present invention is beveled so as to accommodate room for students' legs sitting in the seat behind the present seat being discussed.

Figure 6:
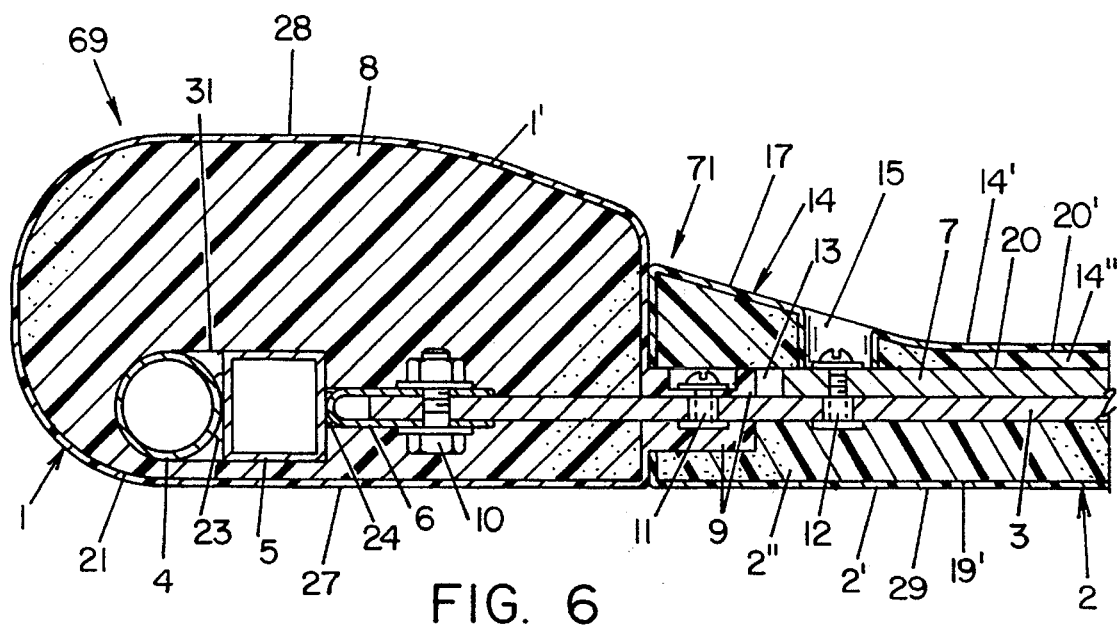
FIG. 6 is a further enlarged cross-sectional view taken along the lines 6—6 of FIG. 1.

FIG. 4 shows the rear modular portion 14 and also the integral skin 14'. The rear modular portion 14 is affixed to the front plywood by means of connector 12. The front piece of plywood 3 and the rear piece of plywood 7 are alternatively referred to herein as the front substrate or first piece of plywood or the second substrate or second piece of plywood. Connector 12 affixes the rear plywood module 14 to the front plywood module 3. FIG. 6 illustrates the screw and receptacle which comprises the connector 12. Various connectors designated by the reference numerals 10, 11 and 12 are illustrated in FIG. 4.

Figure 5:
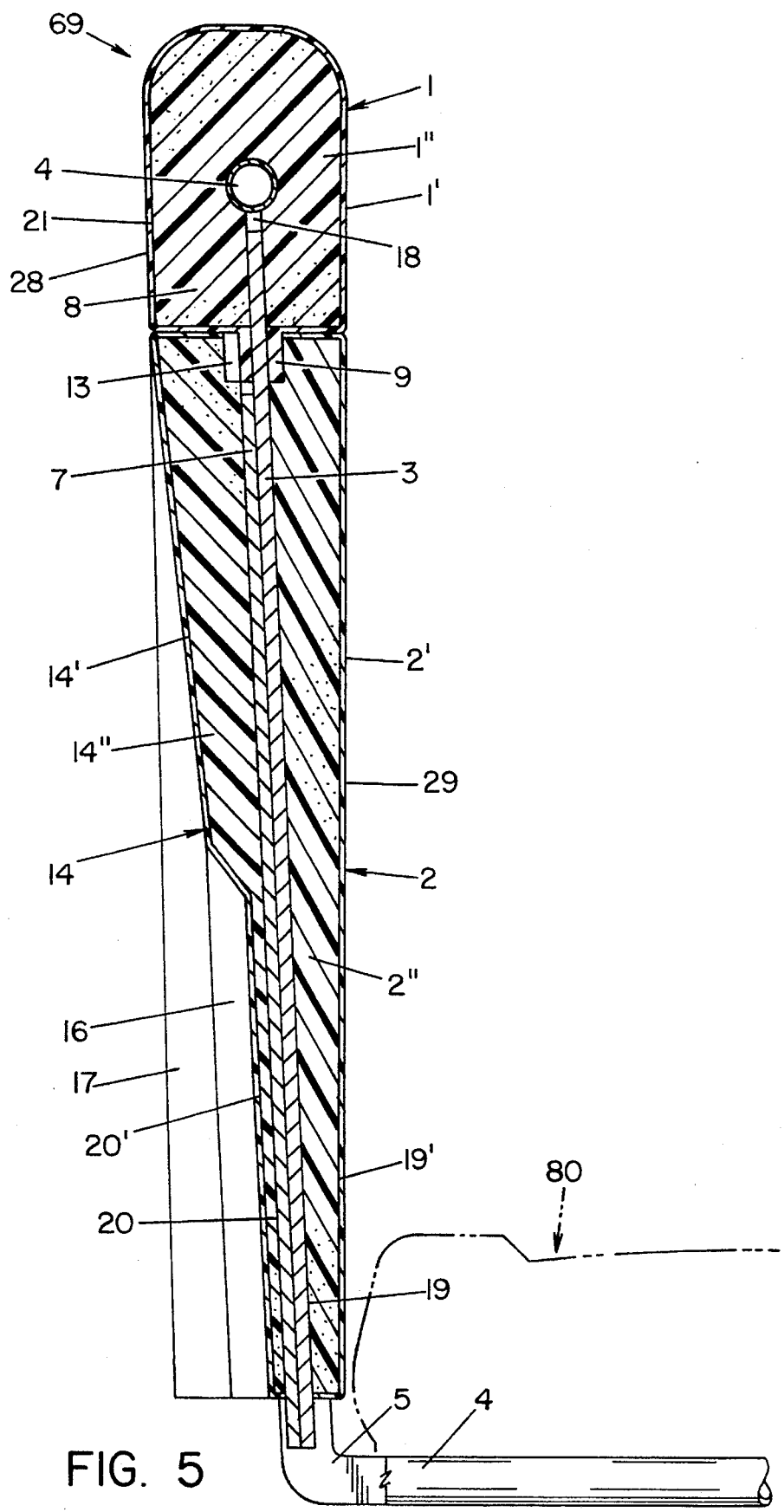
FIG. 5 is an enlarged cross-sectional view of the modular bus seat back taken along the lines 5—5 of FIG. 1.

FIG. 5 is a cross-sectional view of the present invention taken along the lines 5—5 of FIG. 1. FIG. 5 illustrates the front modular portion 2 of the present invention. The front modular portion 2 is comprised of the front plywood 3, the urethane foam 2", and the elastomer skin 2'. It must be understood that the process and structure of the present invention enables the urethane foam to be bonded and secured directly to the front piece of plywood 3. It must be understood that the elastomer skin 2' is bonded directly to the urethane foam 2". The structure is a one piece structure such that the plywood, urethane foam, and the elastomer skin are one piece and are not separable.

FIG. 5 also illustrates the rear modular portion 14. In a similar fashion, the rear modular portion 14 is comprised of the rear plywood 7, the urethane foam 14" and the elastomer skin 14'. The rear module is of one piece construction, the plywood-urethane foam-elastomer skin being a single unit.

Reference numeral 19 indicates the interface between the front plywood 3 and the urethane foam 2". The reference numeral 19' indicates the bonding of the elastomer skin 2' to the urethane foam 2". In a similar fashion, the reference numeral 20 indicates the attachment and bonding of the urethane foam 14" to the rear plywood 7. Reference numeral 20' indicates the attachment of the elastomer skin 14' to the urethane foam 14". Similarly, in FIG. 5, reference numeral 21 indicates the bonding and adherence of the integral skin 1' to the urethane foam 1".

FIG. 5 illustrates a good view of the tongue portion 9 of the collar 1. It can be seen from FIG. 5 that the tongue 9 extends downwardly along the first piece of plywood and into the front 2 and rear modular 14 portions of the invention. The collar 1, however, is primarily affixed to the first piece of plywood by means of connectors 11 as best seen in FIG. 4.

FIG. 5 also illustrates the tubular support 4 and the channel 5 as previously discussed. FIG. 5 also illustrates the first beveled portion 16 of the rear modular portion of the invention and the second beveled portion 17 of the rear modular portion 14 of the invention. FIG. 5 also illustrates a gap 18 between the front piece of plywood 3 and the tubular support 4.

FIG. 6 is a cross-sectional view taken along the lines 6—6 of FIG. 1. FIG. 6 illustrates the collar 1 and the front modular portion 2 and the rear modular portion 14 connected together. FIG. 6 illustrates the simplicity of removing and repairing the rear modular portion 14 when necessary. Access holes 15 permit easy disconnection of the rear modular portion 14 from the front modular portion 2. It is anticipated, however, that the present invention will obviate the need for repairing or replacing bus seats with any frequency. This is due to the unique construction of the elastomer skin surfaces and their integral construction with the urethane foam and their respective plywood pieces. It can be seen, however, that if for some reason the rear modular portion 14 of the bus seat would have to be replaced, it can easily be done so through loosening the screws 12 and disconnecting the rear modular portion 12 from the front modular portion 2. Similarly from a review of FIG. 4, it can be seen that if it is desired that the collar can be removed or replaced by removing the screws from connector 11. To remove the collar 1, the rear modular portion 14 can be bent back by hand to access connectors 11 which secure the collar 1 to the front plywood 3. Reference numeral 71 as illustrated in FIG. 6 is a point where the rear modular portion 14 can be pulled back to access connectors 11.

If it becomes necessary to remove the front modular portion 2 of the invention, it is necessary to remove the connectors 10 which release the first (front) piece of plywood 3. However, it is not anticipated that the first piece of plywood or that the front modular portion of the present invention will be replaced with a high frequency.

The front, rear and seat modular portions of the present invention are manufactured by molding the plywood, the urethane foam, and the elastomer skin into a single piece. The mold is manufactured in the shape of the desired front module, rear module or the collar. The mold is a chamber. The chamber is sprayed with an elastomer spray. The thickness of the elastomer spray determines the thickness of the elastomer skin on the integral modular portion obtained from the molding process.

The mold is first sprayed interiorally and then the plywood is inserted therein. Next, the mold is charged with the urethane foam. The urethane foam bonds directly to the plywood and to the elastomer skin. The mold is then separated and the modular portion is thus obtained. This process yields a unified construction having plywood, urethane foam and an elastomer skin.

The exact same process for molding the collar is followed; the elastomer skin is formed by the spraying of the interior of the mold with the elastomer spray. In the case of the collar 1 no plywood is used. However, another material is inserted into the mold which does not adhere to the urethane foam so as to form a void 31 in the collar so that it may be used as indicated in the drawing figures.

Figure 7:
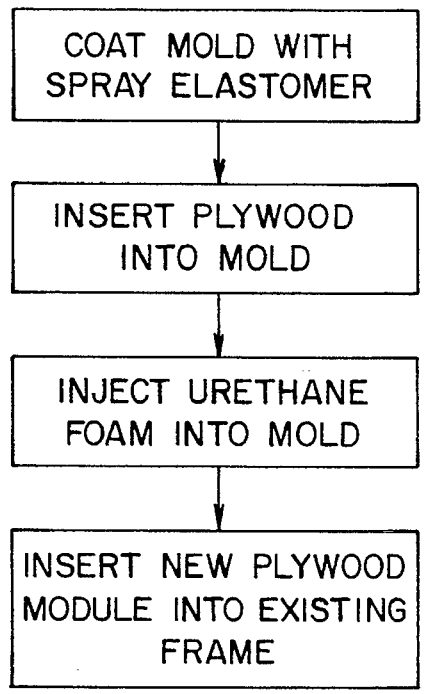
FIG. 7 is a block diagram of the retrofitting steps.

FIG. 7 illustrates in diagrammatic form the molding process. In particular, FIG. 7 illustrates the mold schematically, the spraying (coating) of the mold, the insertion of the plywood or wood into the mold, and the injection of the urethane foam into the mold. In addition, the process is identical in the case of the formation of the collar with the exception that a material is used which does not adhere to the urethane foam so as to form the void 31.

Figure 8:
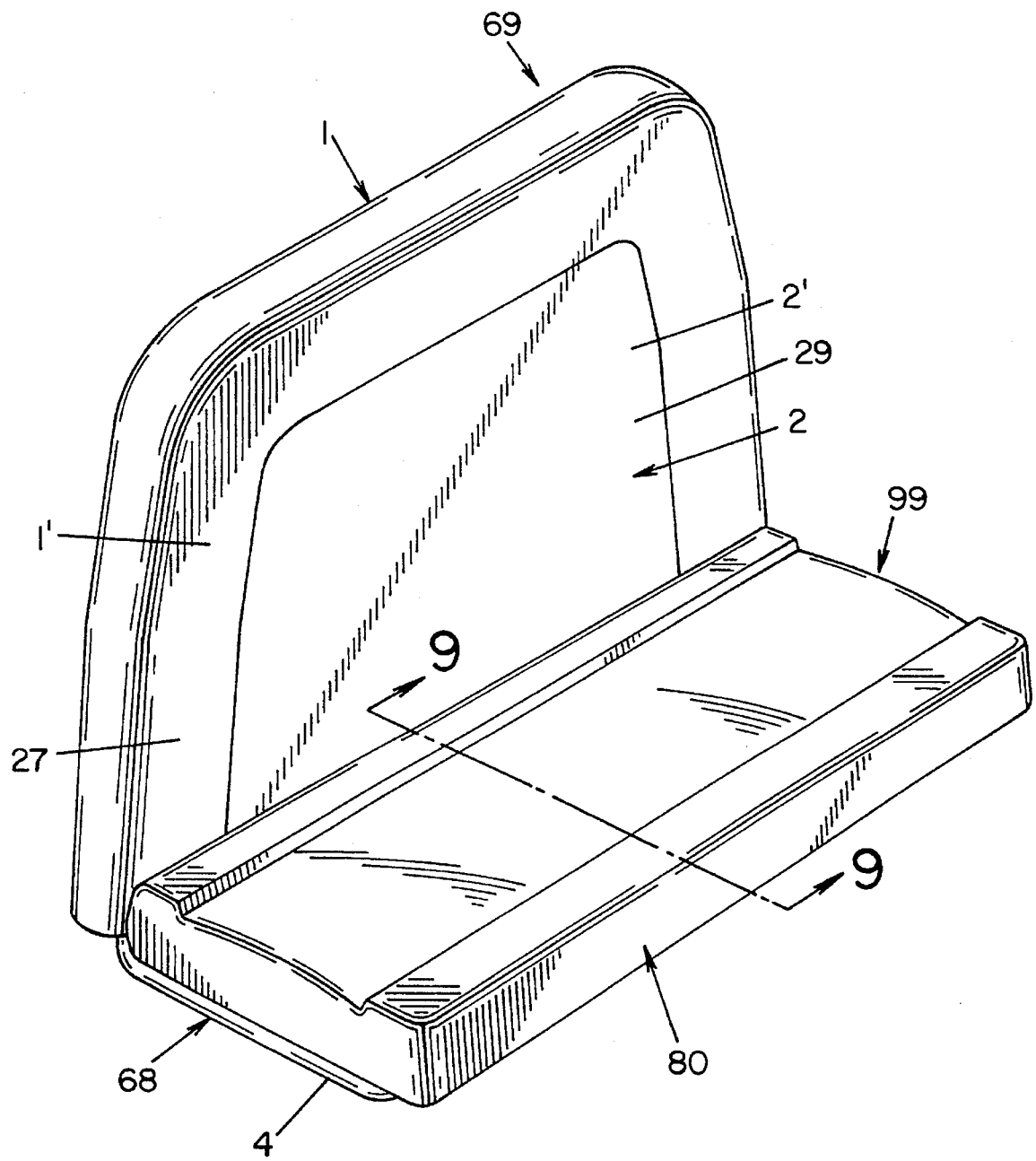
FIG. 8 is a front perspective view of the bus seat back and the bus seat of the present invention.
Figure 9:
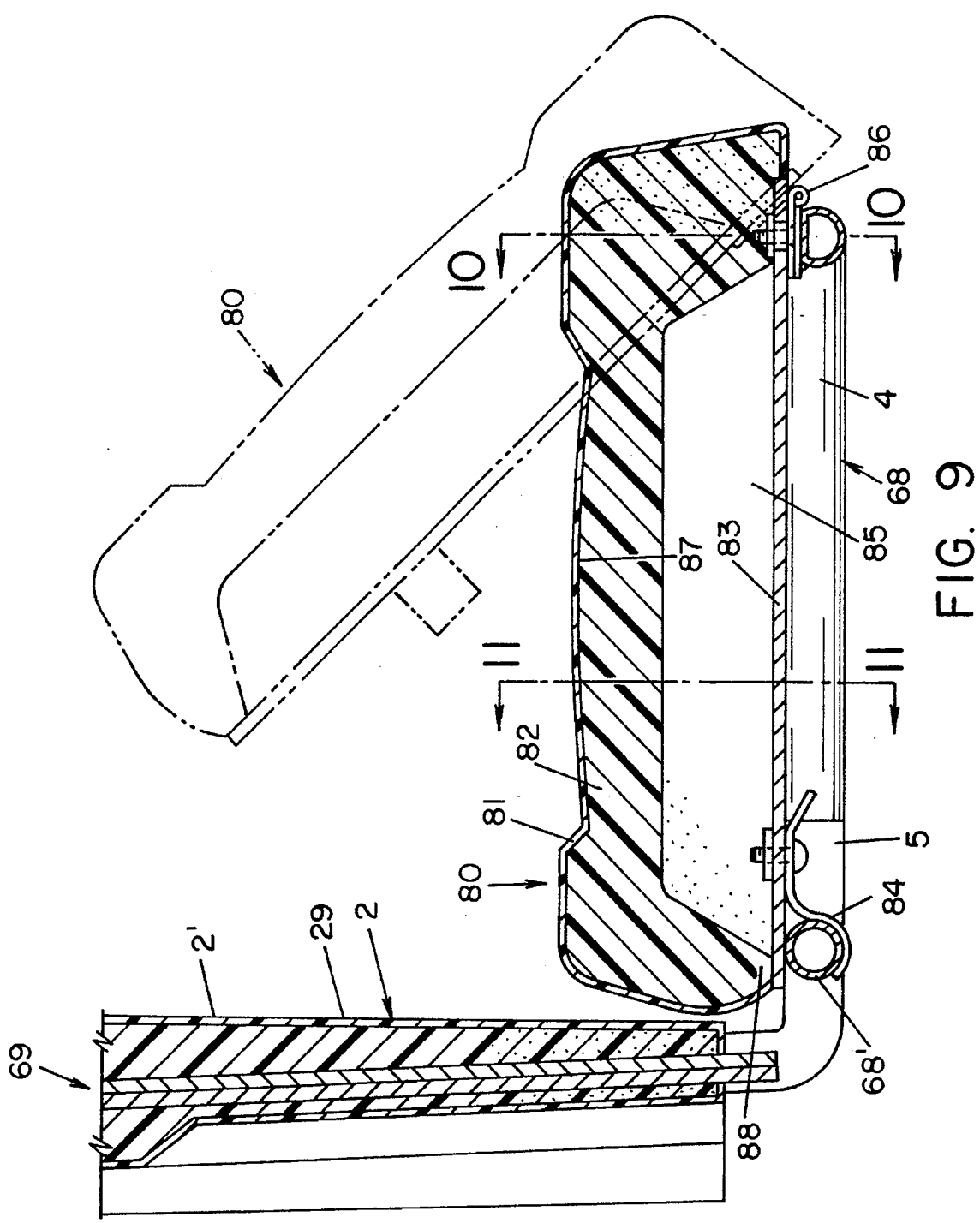
FIG. 9 is a cross-sectional view of the bus seat and the bus seat back taken along the lines 9—9 of FIG. 8.

FIG. 8 is a front perspective view of the bus seat module 80 and the bus seat back 69. FIG. 9 is a cross-sectional view of the bus seat module 80 and the back 69. Bus seat module 80 includes a third piece of plywood 83 and an elastomer skinned urethane foam bonded thereto. The seat module 80 is molded by the same process as the rear 14 and front 2 modules are molded. Reference numeral 81 represents the elastomer skin bonded to the urethane foam 82. FIG. 9 illustrates a void 85 between the elastomer skinned urethane foam 82 and plywood 83. A latch mechanism 84, known in the art, is employed to restrain the seat module 80 in place. Latch mechanism 84 engages a tubular portion 68' of the metal frame superstructure 68. FIG. 1 also illustrates the tubular portion 68' of the metal frame superstructure 68.

FIG. 9 illustrates that the third piece of plywood 83, alternatively referred to herein as the bottom piece of plywood or the bottom substrate, is hinged by means of hinge 86 to the superstructure 68 enabling the seat module 80 to be rotated upwardly for cleaning beneath the seat. Reference numeral 87 signifies the cohesion of the urethane foam 82 to the elastomer skin 81. Similarly, reference numeral 88 signifies the cohesion of the urethane foam to the third piece of plywood 83. It will be observed from FIG. 9 that latch 84 is rotatably released to raise the bus seat module 80.

FIG. 10 illustrates a partial cross-sectional view taken along the lines 10—10 of FIG. 9. FIGS. 10 and 11 are views taken along the aisle side of the bus seat. FIG. 10 is a cross-sectional view taken along the lines 10—10 of FIG. 9. FIG. 10 illustrates latch 84 positioned relatively closer to the aisle side 99 of the bus seat. See, FIG. 8 wherein reference numeral 99 denotes the aisle side of the bus seat. FIG. 11 is a cross-sectional view taken along the lines 11—11 of FIG. 9. FIG. 11 illustrates the relative positioning of the latch 84. FIG. 11 also illustrates the relative positioning of the latch 84. FIG. 11 also illustrates the void 85 and the integral bond 88 of the urethane foam 82 to the third piece of plywood 83.

In the preferred embodiment the elastomer skin is formed by spraying an elastomeric polyurethane spray known as BAYTEC SPR-066A manufactured by Bayer Corporation, 100 Bayer Road, Pittsburgh, Pa. 15205-9741 on the mold surfaces. BAYTEC SPR-066A is a two-component system having an isocyanate component (modified diphenylmethane diisocyanate (MDI) prepolymer)) and a polyol component (polyether polyol blend). In the preferred embodiment the urethane foam employed is known as BAYFIT 566 manufactured by Bayer Inc., Mobay Road, Pittsburgh, Pa. 15205-9741. BAYFIT 566 foam is a two component system having a polymeric MDI (isocyanate component) and a polyol blend (resin) component.

The invention has been described in detail with particular emphasis on the preferred embodiments thereof, but it should be understood that variations and modifications within the spirit and scope of the invention may occur to those skilled in the art to which the invention pertains.

What is claimed is:

1. A bus seat back comprising a metal frame; a front modular portion; a rear modular portion; and a collar portion; said front modular portion comprises a front substrate and an elastomer skinned foam adhered to said front substrate; said rear modular portion comprises a rear substrate and an elastomer skinned foam adhered to said rear substrate; said collar portion comprises an elastomer skinned foam having a void therein; said front substrate of said front modular portion affixed to said metal frame; said rear substrate of said rear modular portion affixed to said front substrate of said front modular portion; said collar portion affixed to said front substrate of said front modular portion adjacent said front and rear modular portions; and, said metal frame and said front substrate of said front modular portion residing partially in said void of said collar portion.

2. A bus seat back as claimed in claim 1 wherein said front and rear substrates of said front and rear modular portions are made of wood.

3. A bus seat back as claimed in claim 2 wherein said elastomer skinned foam adhered to said front and rear substrates is a urethane foam.

4. A bus seat back as claimed in claim 3 wherein said elastomer skin of said rear modular portion is thicker than said elastomer skin of said front modular portion.

5. A bus seat back comprising: a metal frame; a front modular portion; said front modular portion includes a front substrate, a urethane foam, and an elastomer skinned exterior surface: said urethane foam being integrally bonded to said front substrate and to said elastomer skinned exterior surface; a rear modular portion; said rear modular portion includes a rear substrate, a urethane foam, and an elastomer skinned exterior surface; said urethane foam being integrally bonded to said rear substrate and to said elastomer skinned exterior surface; a collar portion; said rear substrate of said rear modular portion and said collar portion affixed to said front substrate of said front modular portion; arid, said front substrate of said front modular portion affixed to said metal frame.

6. A bus seat back as claimed in claim 5 wherein said substrates of said front and rear modular portions are wood substrates.

7. A bus seat back as claimed in claim 6 wherein said collar portion includes a frontal exterior and a rear exterior; wherein said front modular pertion includes a front exterior; wherein said rear modular portion includes a rearward exterior; said front exteriors of said collar and said front modular portion residing generally in a plane; and said rearward exteriors of said collar portion and said rear modular portion being contoured to accommodate human beings sitting behind said bus seat back.

8. A bus seat back comprising a metal frame, a front side and a back side; said front side includes a first piece of plywood; said back side includes a second piece of plywood; said first and second pieces of plywood include an integral elastomer skinned urethane foam adhered thereto; said first piece of plywood affixed to said metal frame; said second piece of plywood affixed to said first piece of plywood; and, a collar comprising an integral elastomer skinned urethane foam; said collar affixed to said first piece of plywood and being adjacent said front and back sides of said bus seat back.

9. A bus seat comprising a metal frame; a bus seat back; a bus seat bottom; said bus seat back includes a front modular portion, a rear modular portion and a collar portion; said front modular portion comprises an elastomer skinned foam and a front substrate; said elastomer skinned foam self-adhered to said front substrate; said front modular portion being affixed to said metal frame; said rear modular portion comprises an elastomer skinned foam and a rear substrate; said elastomer skinned foam self-adhered to said rear substrate; said rear substrate of said rear modular portion being affixed to said front substrate of said front modular portion; said bus seat bottom comprises a bottom substrate and an elastomer skinned foam: said elastomer skinned foam self-adhered to said bottom substrate; said bottom substrate of said bus seat bottom affixed to said metal frame; and, said collar portion affixed to said front modular portion adjacent said front and rear modular portions.

10. A bus seat as claimed in claim 9 wherein said front substrate, said rear substrate, and said bottom substrate are made of wood.

11. A bus seat as claimed in claim 9 wherein said elastomer skinned foam adhered to said front, rear and bottom substrates is a urethane foam.

12. A bus seat as claimed in claim 9 wherein said collar portion comprises an elastomer skinned foam having a void therein.

* * * * *

UNITED STATES PATENT AND TRADEMARK OFFICE
CERTIFICATE OF CORRECTION

PATENT NO : 5,609,395
DATED : March 11, 1997
INVENTOR(S): Selwyn Arthur Burch

It is certified that error appears in the above-identified patent and that said Letters Patent is hereby corrected as shown below:

Col. 6, line 55, delete "FIG. 11 also illustrates the relative positioning of the latch 84."

Col. 7, line 38, after "surface", delete ":" and insert ";".

Col. 7, line 46, delete "arid", and insert "and".

Col. 8, line 35, after "foam", delete ":", and insert ";".

Signed and Sealed this

Eighth Day of July, 1997

Attest:

Attesting Officer

BRUCE LEHMAN

Commissioner of Patents and Trademarks